United States Patent [19]

Diepeveen et al.

[11] Patent Number: 4,641,192
[45] Date of Patent: Feb. 3, 1987

[54] FOCUS-CORRECTED CONVERGENT BEAM SCANNER

[75] Inventors: Neal Diepeveen, Fair Lawn; Robert Bastian, Wyckoff, both of N.J.

[73] Assignee: Magnavox Government and Industrial Electronics Company, New York, N.Y.

[21] Appl. No.: 684,200

[22] Filed: Dec. 20, 1984

[51] Int. Cl.⁴ .......................... H04N 3/08; H04N 3/09
[52] U.S. Cl. ...................................... 358/206; 358/113
[58] Field of Search ............... 358/206, 207, 113, 199; 350/486, 6.7; 250/332, 334, 347

[56] References Cited

U.S. PATENT DOCUMENTS

| | | | |
|---|---|---|---|
| 1,787,920 | 1/1931 | Watson | 358/206 |
| 2,089,588 | 8/1937 | Von Mihàly | 358/206 |
| 3,626,091 | 12/1971 | Casper | 358/113 |
| 4,575,632 | 3/1986 | Lange | 358/113 |

Primary Examiner—Howard W. Britton
Attorney, Agent, or Firm—Marc D. Schechter

[57] ABSTRACT

A focus-corrected convergent beam scanner includes a lens arranged to receive light from a scene and to form an image of the scene in an image plane. A mirror annulus is arranged behind the lens to reflect light from the scene which is passed through the lens. A detector is arranged to receive light from the scene which has been reflected by the mirror annulus. The mirror annulus is rotatable about an axis of rotation in order to scan the image of the scene across the detector. The tilt angle of the reflecting surface of the mirror annulus varies as a function of the position of the reflecting surface along the circumferential axis of the mirror annulus. The circumferential axis is arranged at a varying distance from the lens such that the image plane of the scene is always reflected onto the detector.

7 Claims, 5 Drawing Figures

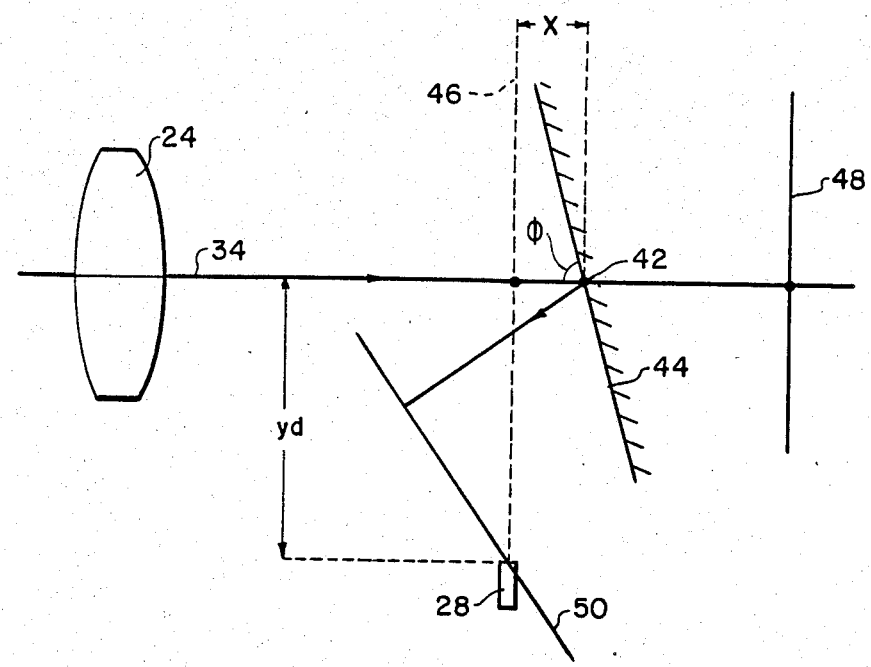
FIG.4
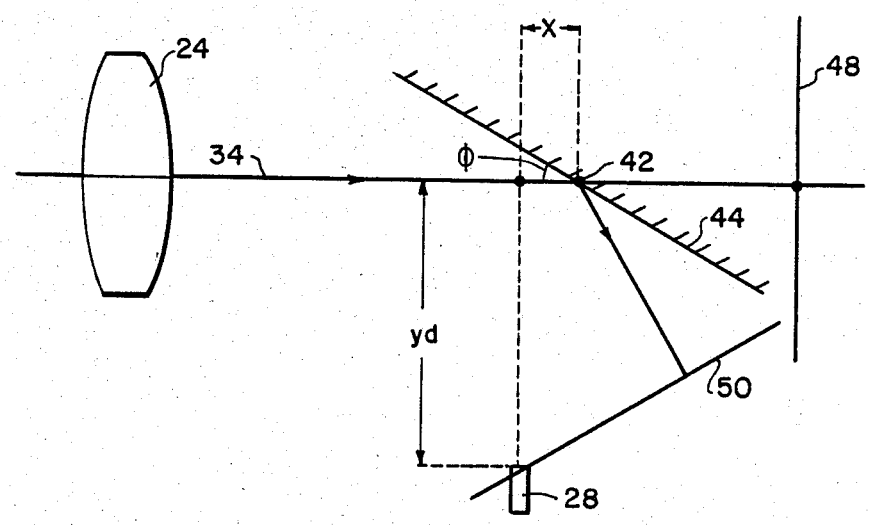

FOCUS-CORRECTED CONVERGENT BEAM SCANNER

BACKGROUND OF THE INVENTION

The invention relates to image pickup devices, particularly devices for picking up infrared images of scenes and converting these images to electrical signals. The electrical signals may then be converted into visible images of the infrared scenes.

A known image pick up device is shown in FIG. 1. In this image pickup device, light rays 8 from a distant object 10 are converged by a double convex lens 12. The converging light rays are reflected by a scan mirror 14 to produce an image 16 of the object 10 on a detector array 18. The detector array 18 is, for example, a linear array extending perpendicular to the plane of the drawing.

In order to scan the image 16 across the detector array 18, the scan mirror 14 is pivoted around axis 20. Because the scan mirror 14 is reflecting converging rays 8 (as opposed to the parallel rays between the object 10 and the lens 12), this image pick up device is sometimes referred to as a convergent beam scanner.

A number of problems arise when one attempts to scan the image 16 across the detector array 18 in a television-compatible manner. The scan frequency for television-compatible scanning is 60 cycles per second. Each scan cycle consists of an active portion and an inactive or flyback portion. In the active portion, the pivot or tilt angle of the mirror 14 varies linearly with time. An electrical signal representing the image is produced at the output of the detector array.

During the inactive or flyback portion of the scan cycle, the mirror 14 is brought back to its initial position in order to ready it for the next active scan. During flyback, no image signal is produced.

The flyback of mirror 14 must be achieved in 8% of the 1/60 second scan cycle (0.00133 seconds). In order to accomplish such a fast flyback, the size of mirror 14 must be reduced.

However, as the size of mirror 14 is reduced, the mirror must be moved closer to the focal point 22 of lens 12. By moving the mirror closer to the focal point 22, the focusing error due to scanning a convergent beam is increased. As a result, a blurred image is scanned across the detector array.

The pickup device shown in FIG. 1 also suffers from the problem of vibration. The vibration arises from repeatedly changing the direction of rotation of the scan mirror 14.

SUMMARY OF THE INVENTION

It is an object of the invention to provide an image pickup device having a convergent beam scanner which avoids defocusing error.

It is another object of the invention to provide a convergent beam scanner having a high scan efficiency (i.e. a fast flyback).

It is a further object of the invention to provide an image pickup device with reduced vibration.

According to the invention, an image pickup device includes a lens means, a rotatable mirror annulus, and a detector means. The lens means receives light from a scene and forms an image of the scene in an image plane. The mirror annulus has a reflecting surface for reflecting light from the scene onto the detector means.

In the image pickup device according to the invention, the mirror annulus has a circumferential axis which intersects the optical axis of the lens means through the entire rotation of the mirror annulus. The reflecting surface is arranged at a tilt angle about the circumferential axis. The tilt angle varies as a function of the position of the reflecting surface along the circumferential axis. The distance of the circumferential axis from the lens means, along the optical axis of the lens means, varies as a function of the tilt angle, such that the image plane is always formed on the detector means.

Preferably, the detector means is located in a plane perpendicular to the optical axis of the lens means. The tilt angle is the angle between the reflecting surface of the mirror and the optical axis of the lens means. The circumferential axis of the mirror annulus intersects the detector plane and the optical axis at a location where the tilt angle is 45°.

It is also preferred, according to the invention, that the distance, x, of the circumferential axis from the detector plane is a function of the tilt angle, $\phi$, as given by the equation $$x = Y_d \left[ \frac{\sin(2\phi) - 1}{\cos(2\phi) - 1} \right] \text{ for } \frac{\pi}{8} < \phi \leq \frac{\pi}{2},$$

where $Y_d$ is the distance of the detector means from the optical axis of the lens means (which is also equal to the distance of the detector plane from the focal point of the lens means).

The lens means may be, for example, an ordinary spherical objective lens or an anamorphic lens.

BRIEF DESCRIPTION OF THE DRAWING

FIG. 3 is a schematic view of a portion of the image pickup device according to the invention with the mirror annulus at a first rotational position.

FIG. 4 is a schematic view of a portion of the image pickup device according to the invention with the mirror annulus at a second rotational position.

DESCRIPTION OF THE PREFERRED EMBODIMENTS

Figure 2:
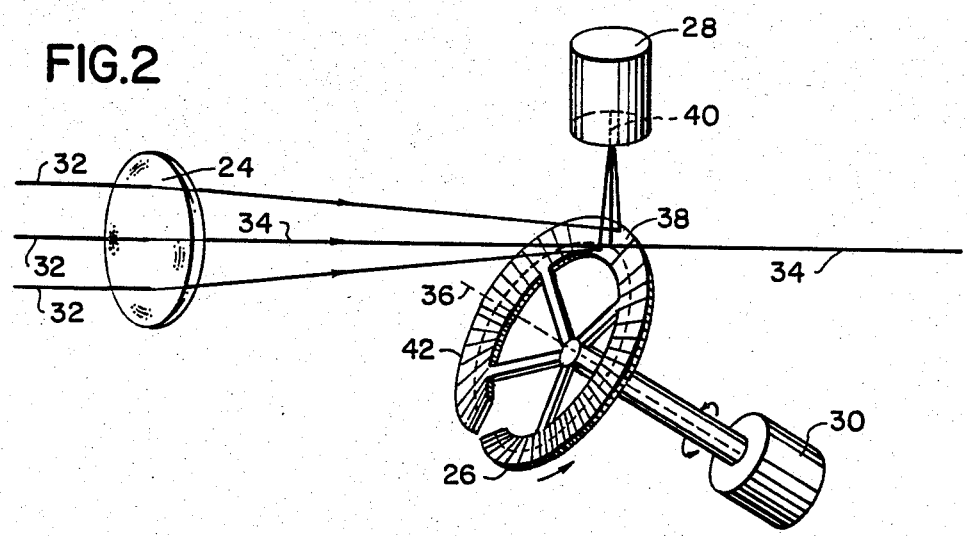
FIG. 2 is a partly schematic, partly perspective view of an embodiment of an image pickup device according to the invention.

FIG. 2 shows an embodiment of an image pickup device according to the invention. The image pickup device includes a lens means 24, a mirror annulus 26, a detector means 28, and a means 30 for rotating the mirror annulus.

The lens means 24 is arranged to receive light rays 32 from a distant scene (that is, a scene located well beyond the focal distance of the lens means 24). From these light rays, lens means 24 forms an image of the scene in an image plane. The lens means 24 has an optical axis 34.

The lens means 24 may be one or more optical components for forming a real image of a scene. For example, lens means 24 may be an objective lens.

Figure 5:
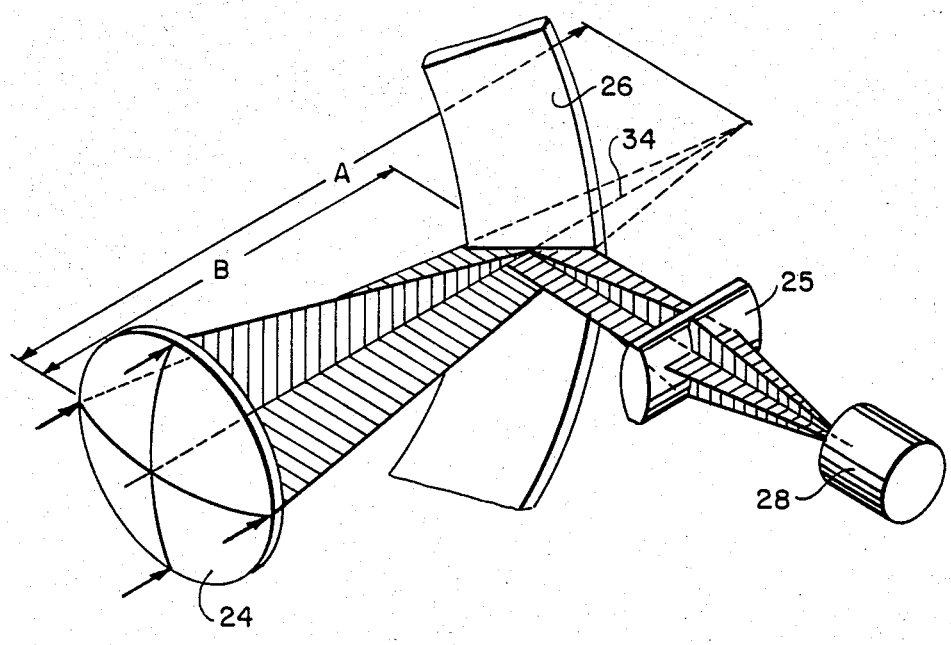
FIG. 5 is a perspective view of another embodiment of the image pickup device according to the invention.

Preferably, lens means 24 is an anamorphic lens. (FIG. 5.) An anamorphic lens is a lens having different focal lengths in different planes, for example focal length A in the horizontal plane and focal length B in the vertical plane. The anamorphic lens 24 forms the ray bundle onto a narrow line on the mirror annulus 26 in order to minimize the difference in the tilt angle from one side of the ray bundle to the other.

When lens 24 is anamorphic, a second anamorphic lens 25 is provided between the mirror 26 and the detector means 28, in order to reconstruct the image of the scene on the detector means.

As shown in FIG. 2, the mirror annulus 26 is arranged behind the lens means 24. Mirror annulus 26 is rotatable about an axis of rotation 36 so that the light rays 32 pass sequentially across the entire reflecting surface 38 of the mirror annulus 26 as the mirror annulus is rotated.

Light rays 32 from the scene which have passed through the lens means 24 are reflected by reflecting surface 38 onto the detector means 28. The detector means 28 comprises, for example, a linear array 40 of individual detector elements. The array 40 is oriented so that its projection onto optical axis 34 is perpendicular to optical axis 34.

The detector elements in array 40 may be any conventional light detectors.

In order to scan the light rays 32 across the detector means 28, the reflecting surface 38 of the mirror annulus 26 is arranged at a tilt angle about the circumferential axis 42 of the mirror annulus 26. As shown in FIG. 2, the tilt angle of the reflecting surface 38 varies as a function of the position of the reflecting surface 38 along the circumferential axis 42. (A gap is shown between the ends of annulus 26 to clearly show the changing tilt angle. In practice, however, this gap would not be present.)

Figure 1:
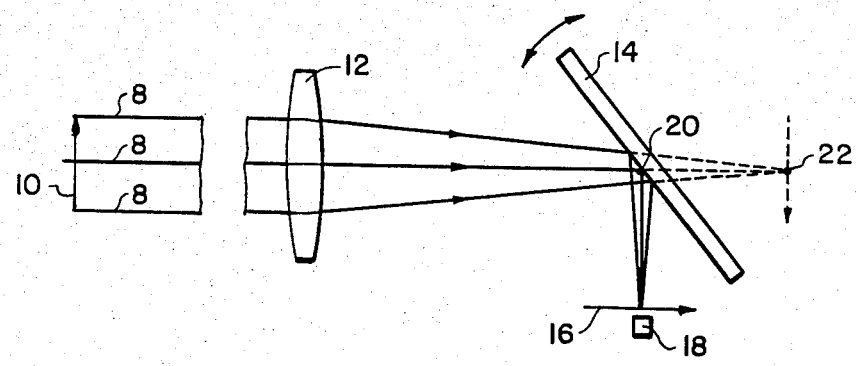
FIG. 1 is a schematic representation of a known image pickup device.

Now, the means 30 for rotating the mirror annulus 26 (for example, an electric motor) causes the mirror annulus 26 to spin on its axis of rotation 36. The mirror annulus 26 and the axis of rotation 36 are arranged such that the circumferential axis 42 always intersects the optical axis 34 through the entire rotation of the mirror annulus 26. As a result, each segment of the reflecting surface 38 which presents itself at the optical axis 34 appears at a different tilt angle. Rotation of the mirror annulus 26 thus approximates the rocking motion of the scan mirror 14 in the prior art arrangement shown in FIG. 1.

In order to scan a sharp image across the detector means 28, the detector means 28 must be arranged at the focal plane of the lens means 24. FIGS. 3 and 4 show how this is achieved in one embodiment of the present invention.

FIG. 3 schematically shows a cross-section through a part of the image pickup device of FIG. 2. The mirror annulus is at a first rotational position such that the mirror segment 44 of the reflecting surface 38 subtends a tilt angle, $\phi$, around the circumferential axis 42. The tilt angle, $\phi$, is measured with respect to the optical axis 34, and in FIG. 3 it is between 45° and 90°.

The detector means 28, in this embodiment of the invention, is arranged in a plane 46 which is perpendicular to the optical axis 34. The perpendicular distance between the detector means 28 and the optical axis 34 is $Y_d$.

In the absence of the mirror annulus 26, the lens means 24 would form an image of the scene at image plane 48. The distance between the image plane 48 and the detector plane 46 is selected to be equal to the distance, $Y_d$, between the optical axis 34 and the light-sensitive surface of the detector means 28.

As the mirror annulus 26 is rotated, the tilt angle, $\phi$, is varied. As a result, the actual image plane 50 is scanned across the detector means 28. In order to maintain the image plane at the surface of the detector means 28, the distance, x, between the circumferential axis 42 and the detector plane 46 must be varied according to the following formula.

$$x = Y_d \left[ \frac{\sin(2\phi) - 1}{\cos(2\phi) - 1} \right] \text{ for } \frac{\pi}{4} \leq \phi < \frac{\pi}{2}.$$

Thus, when the tilt angle is 45°, the distance x is 0. The circumferential axis 42 then intersects both the optical axis 34 and the detector plane 46. On the other hand, when the tilt angle is 90°, the distance x is equal to $y_d/2$. Thus, when the tilt angle is 90°, a far edge of the scene is imaged onto the detector means 28.

In FIG. 4, the image pickup device according to the invention is schematically illustrated with the tilt angle, $\phi$, between 22.5° and 45°. The distance, x, between the circumferential axis 42 and the detector plane 46 is again given by the equation $$x = Y_d \left[ \frac{\sin(2\phi) - 1}{\cos(2\phi) - 1} \right] \text{ for } \frac{\pi}{8} < \phi \leq \frac{\pi}{4},$$

When the tilt angle is 45°, the distance x is again equal to 0. When the tilt angle is 22.5°, x is equal to $y_d$, and a portion of the scene off of the optical axis is imaged onto the detector means 28.

When the tilt angle is less than 22.5°, the distance, x, increases toward infinity as the tilt angle approaches 0°. A real image is no longer formed.

In practice, the tilt angle need only range from 30° to 60°. Accordingly, the limits on the tilt angle are never reached in practice.

Mirror annulus 26 may be manufactured, for example, by starting with a thick aluminum ring. The ring can be machined roughly into the desired shape of annulus 26, after which the precise shape can be produced on a numerically-controlled cutter. If the annulus is to be used to reflect infrared in the 3 to 5 or 8 to 12 micron regions, small imperfections in its surface will not degrade the image quality. If shorter wavelengths are to be used, the aluminum surface can be hand polished after it is cut.

While the mirror annulus produced in the manner described above can be used in a scanner, preferably it is used as a master to produce other mirrors. For example, a negative mold can be produced from the master. Then further mirror annulli can be produced from the negative mold.

Preferably, each aluminum mirror annulus is provided with a conventional overcoat to prevent oxidation and to maintain a highly reflective surface.

FIGS. 2, 3 and 4 show only one embodiment of the present invention. For example, it is not necessary that the detector means 28 be arranged in a plane which is perpendicular to the optical axis 34. The detector plane 46 could be arranged at any angle with respect to the optical axis 34, and then the equations for the location of the circumferential axis 42 can be derived accordingly.

In another variation of the invention, the mirror annulus produces two complete scans of the scene for each complete rotation. Each half of the mirror annulus produces a complete scan. However, the two halves are in slightly nonparallel planes in order to provide interlace.

We claim:

1. An image pickup device comprising:

lens means arranged to receive light from a scene and to form an image of the scene in an image surface, said lens means having an optical axis;

a mirror annulus rotatable about an axis of rotation, said mirror annulus being arranged behind the lens means and having a reflecting surface to reflect light from the scene which is passed through the lens means; and detector means arranged to receive light from the scene which has been reflected by the mirror annulus;

characterized in that:

the mirror annulus has a circumferential axis which intersects the optical axis through the entire rotation of the mirror annulus;

the reflecting surface is arranged at a tilt angle about the circumferential axis, the tilt angle of the reflecting surface varying as a function of the position of the reflecting surface along the circumferential axis; and the circumferential axis is arranged on the optical axis at a distance from the lens means, the distance varying as a function of the tilt angle of the reflecting surface such that the image surface is always reflected onto the detector means.

2. An image pickup device as claimed in claim 1, characterized in that:

the detector means is located in a plane perpendicular to the optical axis;

the tilt angle is the angle between the reflecting surface and the optical axis; and the circumferential axis intersects both the detector plane and the optical axis at a location where the tilt angle is 45°.

3. An image pickup device comprising:

lens means arranged to receive light from a scene and to form an image of the scene in an image surface, said lens means having an optical axis;

a mirror annulus rotatable about an axis of rotation, said mirror annulus being arranged behind the lens means and having a reflecting surface to reflect light from the scene which is passed through the lens means; and detector means arranged to receive light from the scene which has been reflected by the mirror annulus, said detector means being located in a plane perpendicular to the optical axis;

characterized in that:

the mirror annulus has a circumferential axis which intersects the optical axis through the entire rotation of the mirror annulus;

the reflecting surface is arranged at a tilt angle about the circumferential axis, the tilt angle being the angle between the reflecting surface and the optical axis, the tilt angle of the reflecting surface varying as a function of the position of the reflecting surface along the circumferential axis;

the circumferential axis intersects both the detector plane and the optical axis at a location where the tilt angle is 45°; and the position of the circumferential axis on the optical axis varies as a function of the tilt angle of the reflecting surface such that the image surface is always reflected onto the detector means, the distance, x, of the circumferential axis from the detector plane being a function of the tilt angle, $\phi$, as given by the equation $$x = y_d \left[ \frac{\sin(2\phi) - 1}{\cos(2\phi) - 1} \right] \text{ for } \frac{\pi}{8} < \phi \leq \frac{\pi}{2},$$

where $y_d$ is the perpendicular distance of the detector means from the optical axis.

4. An image pickup device as claimed in claim 3, characterized in that the lens means is an objective lens.

5. An image pickup device as claimed in claim 4, characterized in that the device further comprises means for rotating the mirror annulus on the axis of rotation.

6. An image pickup device as claimed in claim 3, characterized in that the lens means is an anamorphic lens.

7. An image pickup device as claimed in claim 6, characterized in that the device further comprises means for rotating the mirror annulus on the axis of rotation.

* * * * *